UNITED STATES PATENT OFFICE.

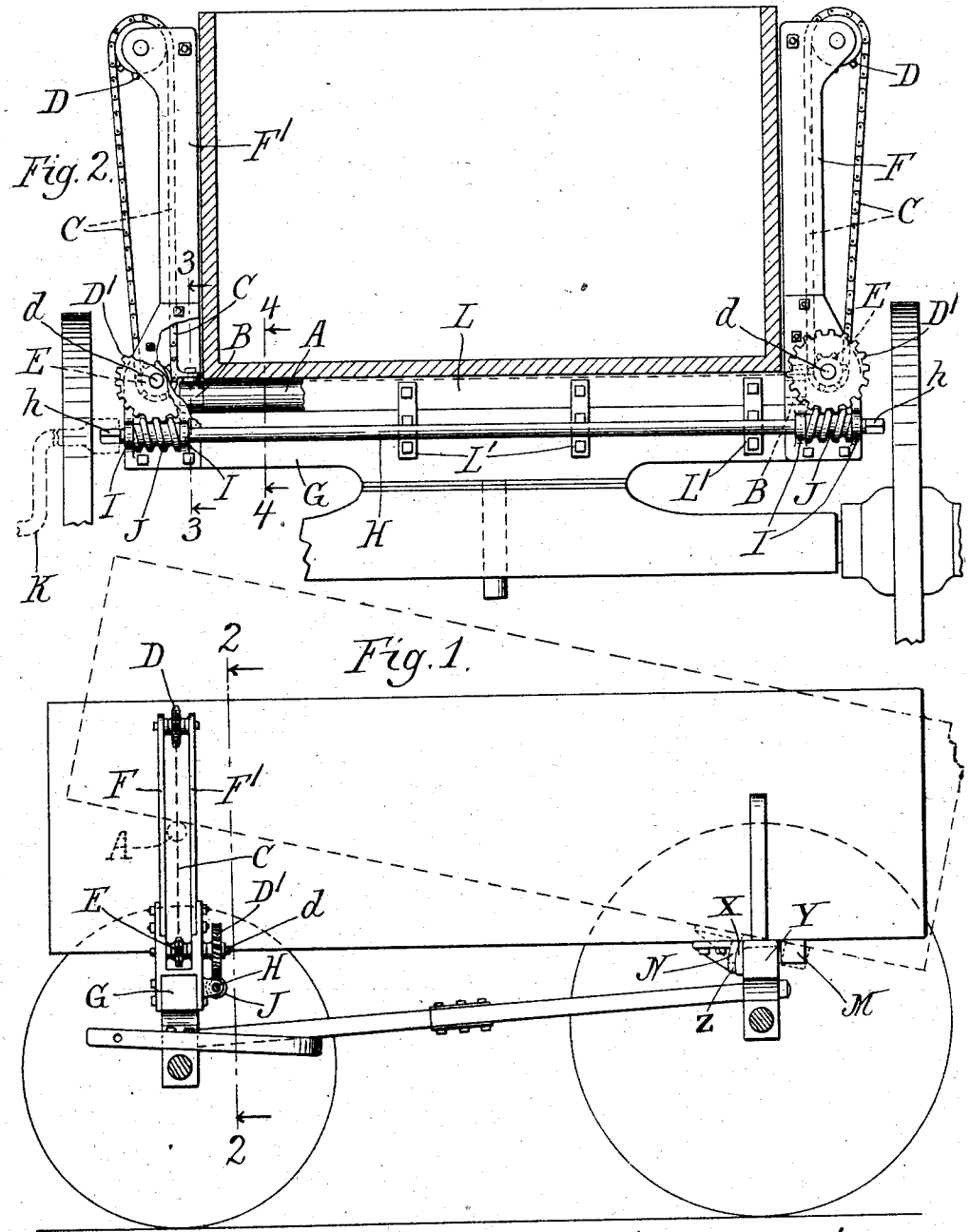

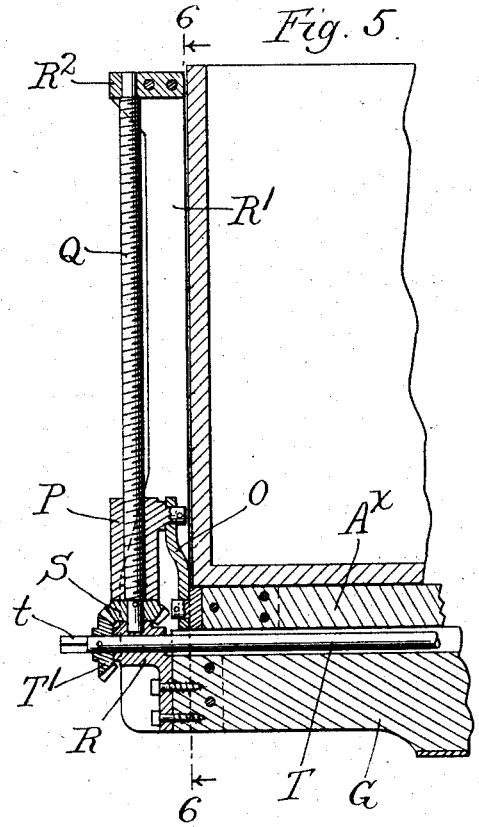
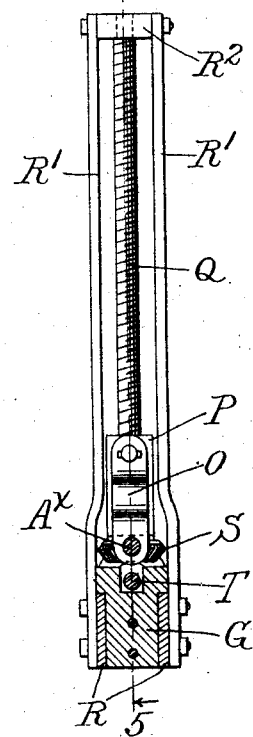
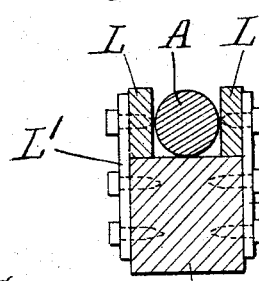
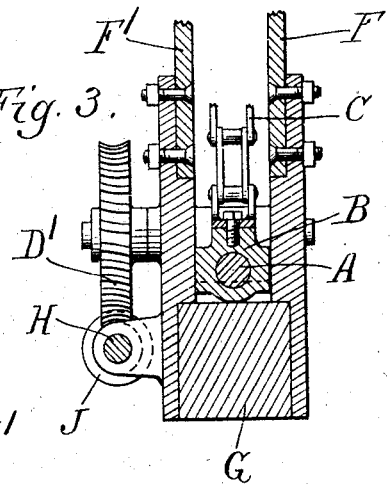

GEORGE B. KILMER, OF VERONA, ILLINOIS, ASSIGNOR TO INDEPENDENT HARVESTER COMPANY, OF PLANO, ILLINOIS, A CORPORATION OF MAINE.

DUMPING-WAGON.

No. 907,150.          Specification of Letters Patent.          Patented Dec. 22, 1908.

Application filed September 3, 1907. Serial No. 391,055.

*To all whom it may concern:*

Be it known that I, GEORGE B. KILMER, a citizen of the United States, residing at Verona, in the county of Grundy and State of Illinois, have invented new and useful Improvements in Dumping-Wagons, of which the following is a specification, reference being had to the accompanying drawings, forming a part thereof.

This invention relates to means for quickly and easily unloading a wagon containing such material as can readily be dumped by simply tilting the wagon box.

The invention consists of the features hereinafter described and shown in the drawings as indicated by the claims.

In the drawings:—Figure 1 is a side elevation of a wagon equipped with one form of the invention. Fig. 2 is a transverse section at the line 2—2 on Fig. 1. Fig. 3 is a detail section at the line 3—3 on Fig. 2. Fig. 4 is a detail section of the channel and the roller, taken at the line 4—4 on Fig. 2. Fig. 5 is a section similar to Fig. 2, section being made at the line 5—5 on Fig. 6. Fig. 6 is a section at the line 6—6 on Fig. 5.

The invention as illustrated comprises an element extending transversely under the wagon box near the forward end; upright supports mounted on the wagon frame to which the ends of the transverse element are connected in a manner permitting up-and-down movement of said element along such supports, and a mechanical power-transmitting device for effecting this movement, shown in two forms.

In the form shown in Figs. 1 and 2 the transverse element above mentioned is a roller, A, journaled at its ends in bearings, B, which are carried on endless chains, C, running over sprocket wheels, D and E, mounted at the top and bottom respectively of each of the two vertical supports, F and $F^1$, shown fixed to the opposite ends of the forward bolster, G. The sprocket wheels are arranged with their axes lengthwise of the wagon body, the lower ones being rigidly mounted upon short shafts, $d$, upon each of which is also fixed a worm gear wheel, $D^1$.

H is a transverse shaft carrying rigid with it near each end a worm, J, positioned to coöperate with the worm gear wheels, $D^1$. The shaft, having its ends squared at $h$ for receiving a crank handle, K, is mounted in bearings, I, upon the forward bolster and constitutes the initial member of the power-transmitting device. The vertical supports each consist of two parallel bars, F and $F^1$, and are formed to serve as guides for the roller bearings, B, as they are raised by the chains in the operation of the device. In the upper face of the forward bolster and extending throughout its length there is provided a channel which may be formed in a variety of ways, for example, as shown in the drawings, by mounting a pair of strips, L, L, on edge on the upper face of the bolster, flush with its front and rear surfaces and securing them thereto with cleats, $L^1$, as shown. The depth of the channel thus formed is slightly greater than the diameter of the transverse roller, so that in its normal horizontal position the wagon box rests directly upon the upper edges of these strips, the roller occupying the channel.

Stops, M and N, fixed to the wagon box engage the rear bolster between them and prevent the box from slipping in either direction. The working face of the front stop, N, is concaved in the form of an arc struck about the lower forward corner of the rear stop, M, as a center, the result being a correct fit of the stops to the bolster at all desired positions of the wagon-box, whether horizontal or tilted. Preferably a wearing plate, X, is mounted on the forward side of the rear bolster, Y, being convex, for seating the concave surface, Z, of the stop, N.

Another of the possible forms of the invention is shown in Figs. 5 and 6. In this form the transverse element is not a roller but simply a bar, $A^\times$, extending across under the wagon-box near its forward end. Each end of this bar is connected by a link, O, to a nut, P, which runs on a vertical threaded shaft, Q. Each shaft is journaled at both ends in an upright frame embodying a lower bracket, R, fastened to the end of the bolster, and constituting the lower journal bearing, side members, $R^1$, and an upper journal bearing, $R^2$. Near the lower end of each of the threaded shafts, Q, there is rigidly mounted a bevel gear wheel, S, and coöperating with each of these are bevel gears, $T^1$, fixed on a cross shaft, T, such cross shaft being mounted in bearings formed in the brackets, R. The upper face of the bolster is channeled to accommodate this cross shaft, and both ends of the cross shaft are squared at $t$ to receive a crank handle.

Stops similar to those used in the first form described are provided at the rear bolster. In this construction, the wagon box being fulcrumed on the rear bolster as in that first described, the swinging of the links, O, makes the necessary accommodation for the curved path of the bar as it is raised and lowered.

I claim:—

1. A dumping wagon comprising a running gear having transverse members and a wagon box mounted thereon, in combination with a rigid transverse element extending under the wagon-box near its forward end; upwardly-extending supports mounted upon the running gear near its forward end; means for connecting said transverse element with said supports for up-and-down movement of said transverse element along said upright supports; a power-transmitting device for effecting such movement equally at both ends of said rigid transverse element, comprising a rotated screw at each of said supports, and means on the wagon-box adapting it to be tilted about a rear transverse member of the running gear as a fulcrum.

2. In a dumping wagon comprising a running gear, having forward and rear bolsters, a wagon-box mounted upon said bolsters, and means mounted upon the forward bolster for raising the forward end of the wagon-box above its normal position with respect to said bolster, stops mounted upon the wagon-box in position to engage the rear bolster between them, the forward stop having its rear face curved in an arc about the lower forward corner of the rear stop.

3. In a dumping wagon comprising a running gear, having forward and rear bolsters, a wagon-box mounted upon said bolsters, and means mounted upon the forward bolster for raising the forward end of the wagon-box above its normal position with respect to said bolster, stops mounted upon the wagon-box in position to engage the rear bolster between them, said rear bolster being provided with a fitting for the encounter of the forward stop, said fitting and stop being curved at their contacting faces about the lower forward corner of the rear stop.

4. In a dumping wagon comprising a running gear, having forward and rear bolsters and a wagon-box carried thereon, a transverse element extending under the forward end of the wagon-box; means mounted upon the forward bolster for raising and lowering such transverse element with respect to the bolster; uprights mounted upon the forward bolster positioned and adapted to serve as guides for the ends of the transverse element in its up-and-down movement, and means on the wagon-box adapting it to be tilted about the rear bolster as a fulcrum.

5. A wagon-dumping device comprising, in combination with the box and running gear, a pair of endless chains; sprocket wheels about which they run and standards on the front bolster in which the sprocket wheels are mounted about the sides of the box; a roller extending across under the box; journal bearings for the roller attached to the chains respectively; a transverse shaft journaled on the bolster; worms on said shafts and worm gears meshing with said worms rigid with the lower sprocket wheels respectively.

6. A wagon-dumping device comprising, in combination with the wagon box and the running gear, a box lifter extending across the box above the front bolster; means at the opposite ends of the bolsters for engaging and lifting the opposite ends of said lifter, the bolster being channeled in its upper side to receive the lifter at the normal unelevated position of the box.

In testimony whereof, I have hereunto set my hand at Verona, Illinois, this 19th day of August, A. D., 1907.

GEORGE B. KILMER.

Witnesses:
D. S. BEAL,
H. H. McCORMICK.